July 7, 1931.  A. DUFAUX  1,813,532
ADJUSTABLE SHOCK ABSORBER
Filed Feb. 14, 1929  3 Sheets-Sheet 2
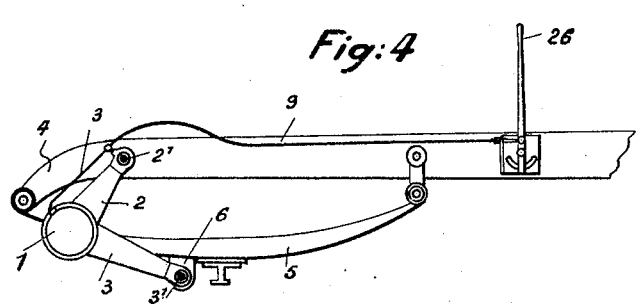
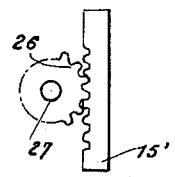
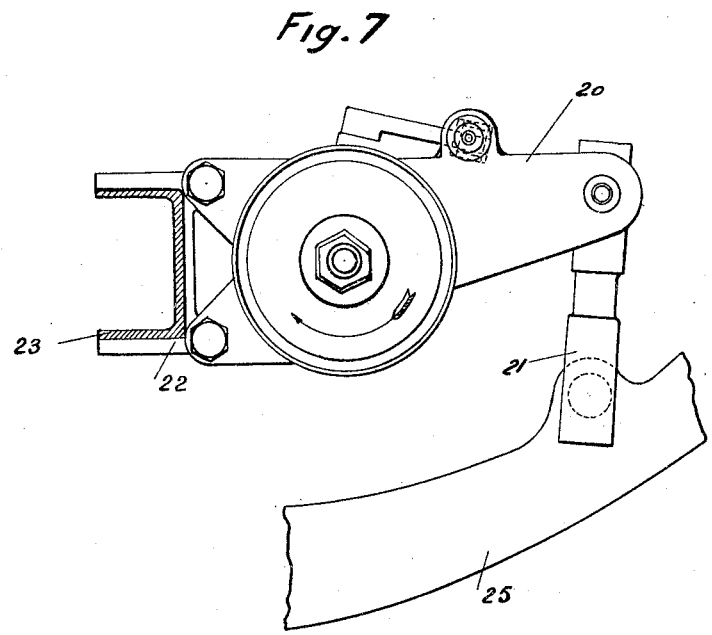

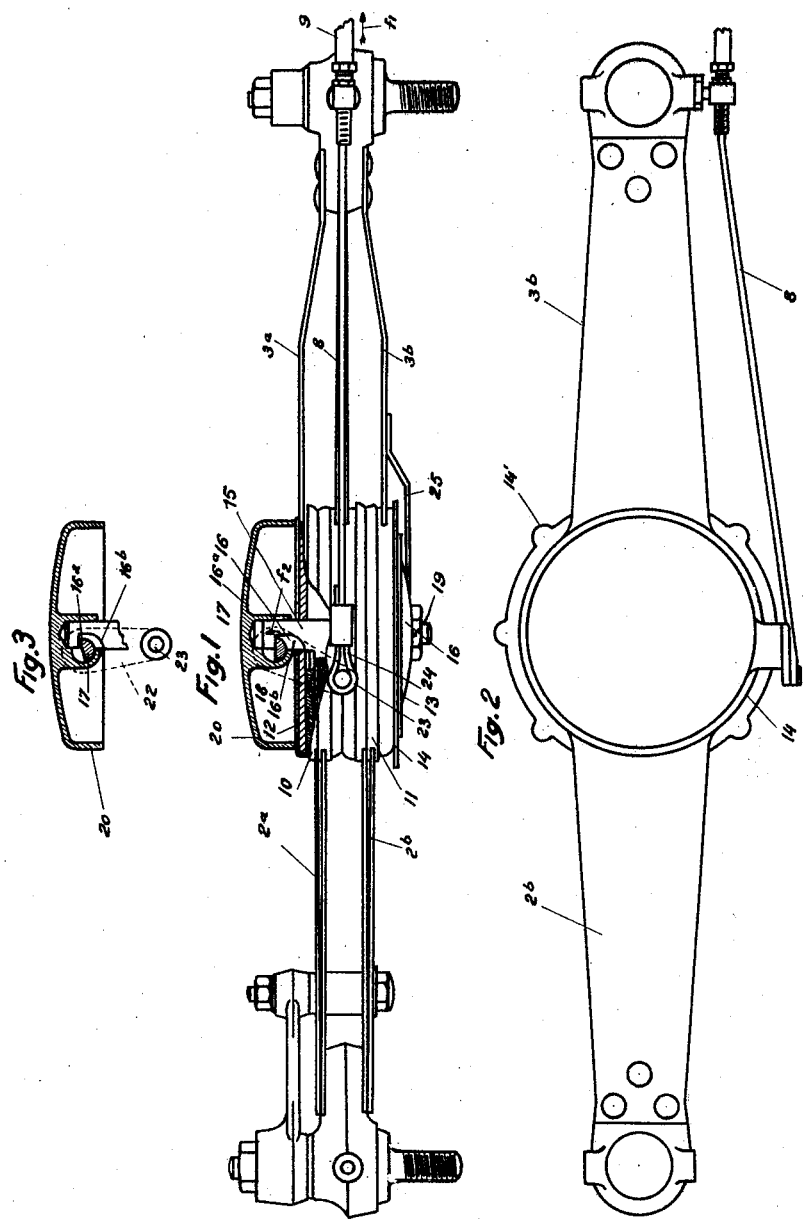

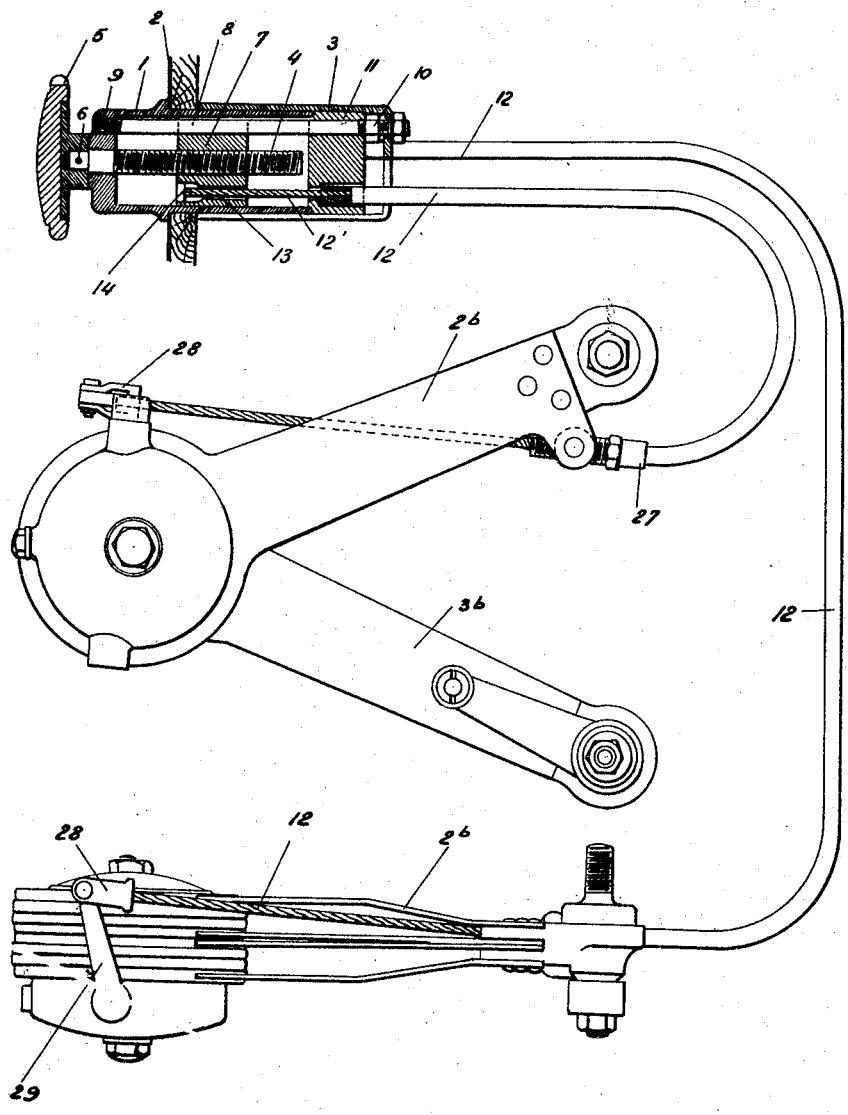

Patented July 7, 1931

1,813,532

UNITED STATES PATENT OFFICE

ARMAND DUFAUX, OF LEVALLOIS, FRANCE

ADJUSTABLE SHOCK ABSORBER

Application filed February 14, 1929, Serial No. 339,901, and in France February 22, 1928.

This invention relates to shock absorbers for automobiles of the type wherein the degree of clamping between the parts of the shock absorber can be controlled at will by means of a mechanical controlling device.

According to the invention, shock absorbers for automobiles comprise a pair of operating arms, friction washers between the said arms, a longitudinally displaceable shaft extending through said washers and said arms, spring means adapted to oppose the movement of said shaft, a second shaft disposed at right angles to the said first shaft, means for rotating said second shaft from the mechanical controlling device, means interconnecting said shafts adapted to cause displacement of said first shaft when said second shaft is rotated.

The parts are so disposed and supported that the longitudinal movement of the first-mentioned shaft effects the variable degree of clamping of the friction washers.

The means interconnecting the two shafts preferably comprise projecting and recessed portions on one shaft engaging recessed and projecting portions on the other shaft, such for example as a single finger, projection or tooth engaging a single notch or the like or a plurality of teeth such as a toothed pinion engaging a rack.

For the rotation of the second shaft it preferably has mounted thereon a lever connected to the mechanical controlling device.

In order that the invention may be better understood, it will now be described with reference to the accompanying drawings in which:—

Fig. 1 is a plan view of my device with parts in section;

Fig. 2 is an elevational view thereof with the arms in extended position;

Fig. 3 is a partial view of Fig. 1 in section showing certain of the elements in another position;

Fig. 4 is an assembly view of my device fixed to a chassis with the control elements thereof on a reduced scale;

Fig. 5 shows an elevational view of a modified control element;

Fig. 6 is an elevational view partly in section of a modified form of adjustable shock-absorber;

Fig. 7 is an elevational view illustrating the application to a shock-absorber with fixed body of the device for clamping the discs.

Referring to the drawings more in detail, and in particular to Fig. 4, as therein shown 2 and 3 represent the two arms or levers of the shock-absorber fixed to the body 1. The extremities $2^1$ and $3^1$ of these two arms are, as usual, fixed to the frame beam 4 and the knee piece 6 of the spring 5. 8 is a rigid rod attached to one end of a flexible cable 9, fixed at the other end to lever 26 which controls the displacement of the clamping member. The rod 8 may in certain cases be eliminated and replaced by the cable itself.

Said clamping member, as well as the other essential elements of my invention are discernable in Figs. 1 and 2. As therein shown $2^a$ and $2^b$, $3^a$ and $3^b$ represent the coupled levers which constitute the arms 2 and 3 (Fig. 4) and which are attached to collars 10 and 11 enclosing the body 12. At 13 is placed a flexible washer of curved shape playing the part of a spring. The said washer bears on a cheek 14 which serves to verify initial zero clamping of the nut 19.

Said cheek 14 is provided in this end on its periphery with ears 14' allowing the same to be turned by hand in order to establish said initial verification when the lever is at zero.

The curved washer 13 is traversed at the center by a shaft 15 likewise traversing through and through the body 12 of the shock absorber and presenting at the opposite extremity a notch 16. Said notch extends over half the circumference of the shaft 15 and is provided with a flat face $16^a$ and a cylindrical concave surface $16^b$. The notch 16 is destined to partially contain a finger 17 of semi-circular section serving to transmit the control to the shaft 15. The notched extremity of said shaft penetrates a cylindrical recess 18, formed on the interior of a cap 20. On the other extremity, the shaft 15 is clamped against the washer 13 by means of nut 19.

The semi-cylindrical finger 17 is fitted in an axis traversing the cap 20 along a direction perpendicular to that of the shaft 15 and is pivotally mounted in the walls of said cap. On the shaft is keyed the lever 22 shown in dotted lines in Figs. 1 and 3 and whose knob 23 is connected to the bent over extremity 24 of the control rod 8 which is connected by its other extremity to the flexible cable 9 attached to the control lever 26. The knob 23 may likewise be directly connected to the cable 9.

The small flat spring 25 riveted on the arm $3^b$ serves as a braking device for the nut 19.

The operation of the arrangement is as follows:

When the driver of the vehicle acts on the lever 26, he draws the flexible cable 9 in the direction indicated by the arrow $f^1$. The movement of the lever 22 results in the rotation of finger 17 which oscillates in the direction of the arrow $f^2$ and drives the shaft 15 toward the bottom of the cylindrical recess 18 (Fig. 1) and to an extent which varies according to the value of the displacement communicated to the cable 9. The axial displacement which is thus transmitted to the shaft 15 has for effect to press the nut 19 against the washer 13. Due to this fact, the degree of braking of the wood washers constituting the body of the shock-absorber is increased. The friction between the contact surfaces of these annular elements of wood varies to the desired extent and in accordance with the tension exerted by the cable 9 through the medium of lever 22.

As concerns the washer 13, it will be noticed that it must not only act as a simple transmitting element of force, but also as a restoring element, for when the chauffeur moves the lever to the position corresponding to braking, the washer must be able to bring the screw 19 and the shaft 15 to their initial position. Said washer must therefore be springy in character.

Fig. 5 shows another form of construction for controlling the shaft 15 of the shock absorber. Said shaft carries at its inner extremity a rack 15′ in which meshes a straight pinion 26 keyed on a shaft 27 traversing the cap 20. The lever 22 is keyed on the extremity of said shaft in a way to impart partial movements of rotation thereto in accordance with the displacement of the control cable 9.

I am thus able to vary the clamping of the wood-washers constituting the body of the shock absorber as previously described.

The washer 13 might be eliminated for obviously when the flexible cable 9 is released, the elasticity of the elements of the shock-absorber automatically effect unclamping of the wooden washers.

Instead of the control lever 26, I may mount on the dash of the vehicle the device represented in Fig. 6 permitting to obtain a perfect adjustment of the shock-absorbers, which adjustment corresponds to the state of the road and the speed of the vehicle, the whole being placed within reach of the driver's hand.

Referring to Fig. 6, 1 is a fixed casing on the dashboard 2 of the vehicle. This casing is provided with a plug 11 which placed within the hood whereas the other extremity of the casing is disposed in a way to allow the introduction of a threaded rod 4 controlled by a milled button 5, keyed at 6 on the rod 4 and destined to assure perfect operation. On the interior of the casing 1 is displaced, in a direction depending upon the direction of rotation of milled button 5, a nut 7 whose rotation is prevented by two parallel pins 8 screwing into the outer part of the casing at 9 and receiving nuts 10 for locking against the plug 11. 12′ represents the flexible cables or connecting elements whose sheaths 12 are fitted into the plug. The extremities 13 of the cables 12′ are riveted at 14 to the nut 7. A strap 3 is provided for clamping the casing on the dash by means of nuts mounted on pins 8.

$2^b$ and $3^b$ represent the arms of the shock-absorber corresponding to Fig. 2. The cable 12′ is fixed at 28 to a lever 29 which controls a toothed pinion shown at 27 in Fig. 5 and hereinbefore pointed out. Said cable 12′ moreover passes through the perforation of a stretcher 27 fixed on the arm $2^b$ and destined to form an abutment for the sheath 12 of cable 12′ and thus permit regulation of the length thereof.

In Fig. 7, 20 is a simple shock-absorber in which the link 21 is fixed to the axle piece 25 and the knee 22 bolted on the frame beam 23 of the chassis.

Returning to Fig. 6 the operation will be obvious and takes place as follows:

The rotation imparted to knob 5, causes the threaded rod 4 to be driven in the same direction. The threads of said rod, due to guiding pins 8 cause the nut 7 to become displaced axially which nut carries with it the cables 12′ with which it is made rigid.

It will thus be seen that by a simple movement of a milled knob, the same pressure is transmitted to the shock absorbers for, in fact, it is difficult to conceive any number of flexible cables connecting the shock-absorbers to the control regulating device by fours in pairs or separately.

While I have disclosed what I deem to be the preferred forms of my invention by way of example I do not wish to be limited specifically thereto as there might be many changes made in the form, construction, and arrangement of parts without departing from the spirit of my invention, insofar as said changes come within the scope of the appended claims.

Having described my invention what I claim as new and desire to secure by Letters Patent is:—

1. In a shock-absorber for automobiles of the type set forth, the combination of a pair of operating arms, friction washers interposed between said arms, a longitudinally displaceable stud shaft extending through said washers and said arms, spring means adapted to oppose the movement of said shaft, a second shaft disposed at right angles to said first shaft, means for rotating said second shaft, and means interconnecting said shafts adapted to cause displacement of said first shaft when said second shaft is rotated, for the purposes set forth.

2. A shock-absorber for automobiles as claimed in claim 1 in which the means interconnecting the two shafts comprise projecting and recessed portions on one shaft engaging recessed and projecting portions on the other shaft, for the purposes set forth.

3. A shock-absorber for automobiles as claimed in claim 1 in which the means interconnecting the two shafts comprise intermeshing toothed portions for the purposes set forth.

4. A shock-absorber for automobiles as claimed in claim 1 in which the spring means to oppose the movement of the first shaft is disposed at one end thereof, the inter-engaging connection between the two shafts being disposed at the other end of the said first shaft, and in which a cap is provided adapted to fit over the last mentioned extremity of said first shaft for supporting said second shaft.

5. In a shock-absorber for automobiles of the type set forth, the combination of a pair of operating arms, friction washers interposed between said arms, a longitudinally displaceable stud shaft extending through said washers and said arms, spring means adapted to oppose the movement of said shaft, a second shaft disposed at right angles to said first shaft, a lever on said second shaft, means interconnecting said shafts adapted to cause displacement of said first shaft when said second shaft is rotated, a flexible cable operatively connected with the lever on the said second shaft, and manually operable means within reach of the operator for controlling the displacement of said cable, for the purposes set forth.

6. In a shock-absorber for automobiles of the type set forth, the combination of a pair of operating arms, friction washers interposed between said arms, a longitudinally displaceable stud shaft extending through said washers and said arms, spring means adapted to oppose the movement of said shaft, a second shaft disposed at right angles to said first shaft, a lever on said second shaft, means interconnecting said shafts adapted to cause displacement of said first shaft when said second shaft is rotated, a flexible cable operatively connected with the lever on the said second shaft, an axially fixed threaded rod adapted to be rotated, a hand knob for said rod, a nut mounted on said rod attached to said flexible cable, and means for preventing rotation of said nut when said rod is rotated whereby said cable may be displaced at will, for the purposes set forth.

In testimony whereof I hereunto affix my signature.

ARMAND DUFAUX.